INVENTORS
DONALD C. GRUBBA
JOHN D. PETERSON

3,625,717
SPRAY COATING COMPOSITIONS
Donald C. Grubba, Westboro, and John D. Peterson,
North Grafton, Mass., assignors to AVCO Corporation,
Cincinnati, Ohio
Filed Apr. 29, 1968, Ser. No. 724,906
Int. Cl. C04b 33/00
U.S. Cl. 106—39 R      4 Claims

ABSTRACT OF THE DISCLOSURE

The invention relates to a spray coating composition. The composition includes a ceramic matrix material which has been reacted with additives to form an additional phase within the matrix; the combination of matrix material and additional phase material improving coatability and coating properties. A preferred example of such a composition is an alumina ($Al_2O_3$), zirconia ($Zr_2$) and chromia ($Cr_2O_3$) matrix with an additional phase formed from alumina, zirconia or chromia with iron oxide ($Fe_2O_3$) and titanium dioxide ($TiO_2$). Silicon dioxide ($SiO_2$) is also a candidate additive for forming a glassy phase or mullite when reacted with the alumina.

BACKGROUND OF THE INVENTION

Plasma coating is fast becoming a highly, very popular and useful procedure for coating many forms of substrates. By means of plasma spraying refractory and wear resistant coatings may be applied to low temperature material or to materials that do not resist mechanical or chemical erosion.

Popular coating materials are alumina, chromia and stabilized zirconia. Future reference to zirconia herein shall mean stabilized zirconia. While in prior practice there are many applications in which alumina, chromia and zirconia are useful, there are a great many other applications in which these materials cannot be used as a single phase coating. Single phase sprayed coatings of alumina, chromia and zirconia are generally excessively porous. Discontinuities appear between adjacent areas of the coating, and produce a scaliness and flakiness, i.e. a nonhomogeneous structure.

The finish to which these coatings may be prepared is severely limited by the porosity and because of the coating structure these materials do not react to their full capability under impact and debilitating environments calling for extremely good wear resistance.

To overcome these limitations it has been necessary to substitute chromia in uses where alumina and zirconia ought to serve well. Chromia as a low density coating provides a better finish and greater resistance to shock and abrasion than alumina and zirconia. However, chromia is expensive and, additionally, its deposition efficiency—that is ratio of the amount of material depositing on a substrate to the amount of material consumed in the spraying process—is extremely low.

OBJECTS

It is an object of the invention to provide a spray coating material which avoids the limitations and disadvantages of prior materials.

Other objects of the invention are to provide a spray coating feed stock composition which:

(1) Produces a low cost, dense and wear resistant coating;
(2) Exhibits improved sprayability;
(3) Can be deposited with a high efficiency;
(4) Will yield a coating of greater hardness;
(5) Will yield a coating that may be finished to an exceptionally high degree;
(6) Impacts on the substrate as a fluid and yields a high recrystallized coating on freezing;
(7) Will yield a homogeneous coating though it contains at least two material phases; and
(8) Will yield a coating having a predictable multiphase composition and structure.

It is still another object of the invention to provide a method of forming a spray coating composition containing a ceramic matrix and an additional phase formed from the matrix material and selected additives.

In accordance with the invention a spray coating composition comprises a ceramic matrix in combination with property modifiers formed by sintering the ceramic matrix material with at least a second material in minor proportions. As a result of the sintering, one or more additional phases are dispersed within the matrix material for adjusting a property of the spray coating composition or a coating formed therefrom.

Another purpose of the invention is to provide a method of making the spray coating composition described above.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 4:
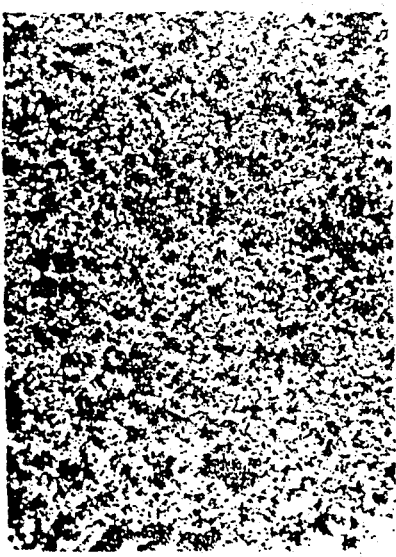
FIG. 4 is a chromium oxide single phase coating of 99% purity.

Spray coating compositions formed from a mixture of two materials where the minor constituent is present in less than 5% by weight is essentially a single phase material. The benefits observed and described in this discussion are not realized in spray coating compositions with a small quantity of a minor additive.

In the inevitable compromise that must be made with regard to coating properties, deposition efficiency and economic factors, spray deposited coatings, generally, are less dense than theoretical density and not as hard as the material that makes up the coating. As a result, the full material capability of single phase plasma deposited coatings have not been fully utilized.

Ceramic particles are sometimes coated with a metal, such as nickel or chromium, to overcome some of the limitations of the single phase coating. Even this is a compromise solution with the most obvious compromise being made in hardness.

Plasma coatings are most often made by supplying particles of the coating material to an electric arc generated in a plasma generating device such as the Avco PG 100 Plasmagun. The particles reside within the arc and plasma environment for a short period of time and are ejected along with the plasma effluent to be deposited on a substrate. If the powders are ceramic, they are generally not molten on impact.

For the materials under consideration, the following spray parameters are used as they were found to be optimum from the point of view of constructing usable coatings with good properties, economically.

(a) PG 100 Plasmagun with 901065 nozzle and argon gas for plasma
(b) 40% plasma gas flow (77 CFH)

(c) 15% powder gas flow (7 CFH)
(d) 3"–4" spray distance
(e) 700 DC amps—21–24.5 kw.
(f) 30–35 DC volts—21–24.5 kw.
(g) Powder feed rate of 2–4 #1 hour Plasma spray equipment capable of spraying coating compositions provided in rod form are also provided. See the Jensen patent, 3,140,380. Generally particles of the coating composition are held in the rod by a low temperature binder which evaporates.

FIGS. 1 through 4 are photomicrographs, to the same magnification, of prior art coatings and a coating made in accordance with the teachings of this invention. The coatings are represented in FIGS. 1 through 4. The presintering compositions and coating properties are further identified in the chart immediately below.

| Figure | 1 | 2 | 3 | 4 |
|---|---|---|---|---|
| Composition | FTA | 99+$Al_2O_3$ | 97 $Al_2O_3$ | 99+$Cr_2O_3$ |
| Density, percent theoretical | 92–97 | 85–90 | 86–92 | 88–92 |
| Hardness, Rockwell 15N Scale | 88–92 | 78–84 | 90–94 | 86–90 |
| Deposit efficiency at 3 lbs./hr., percent | 75 | 73 | 72 | 50 |

An analysis of the FTA coating is available. It contains alumina as the principal phase. $Al_2TiO_5$ pseudobrookite as well as $Fe_2TiO_5$ pseudobrookite phases have been identified by X-ray diffraction. When $SiO_2$ is added to FTA an $Al_6Si_2O_{13}$ mullite phase is evident.

X-ray diffraction lines falling between those of aluminum and iron compounds are in good agreement with the postulation of a solid solution of four (Al, Fe)$_2$ TiO$_5$. There is also a continuous solid solution of $Al_2TiO_5$ and $MgTi_2O_6$ (where magnesium is used).

It is extremely difficult to fully identify the constituents making up the spray coating composition.

The spray coating composition is made by sintering particles of pure material that are thoroughly mixed together. The materials combine by diffusion between adjacent particles. It follows therefore that the type of combination in specific finite regions will depend on the types of materials that are in contact. The extent to which a combination proceeds will depend on the relative reactivity and/or solubility of contacting materials. Surface areas in contact is yet another factor.

It follows therefore that macroscopic results are an important consideration. It is also important to recognize that the constituents to be sintered are (1) reactive or (2) soluble with one another to produce additional phases.

Figure 3:
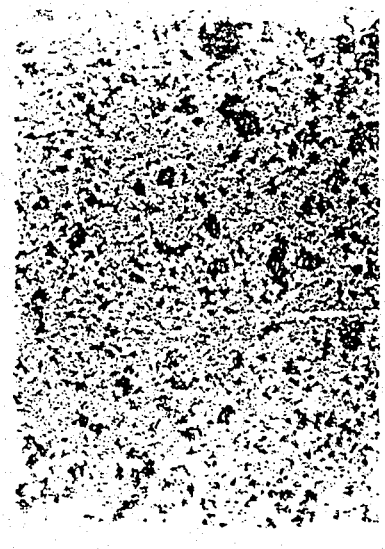
FIG. 3 is another essentially single phase alumina system of 97% purity and 3% $TiO_2$.
Figure 2:
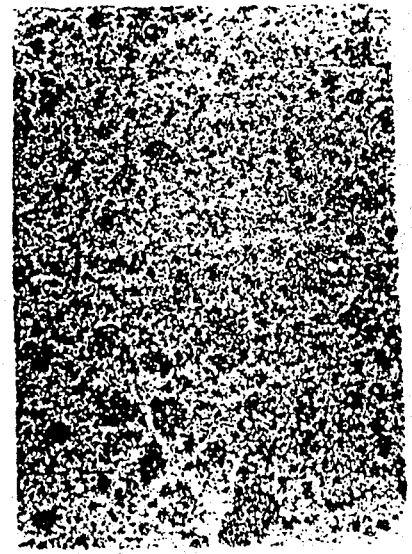
FIG. 2 is an essentially alumina single phase coating containing 99% pure alumina.
Figure 1:
FIG. 1 is an alumina composition made in accordance with the invention.

It will be noted that the maximum upper value of density of the prior art coatings, depicted in FIGS. 2 through 4, represents the minimum density of the multiple phase coating of FIG. 1. A comparison of the hardness indicates that the FIG. 1 coating is harder than two or three prior art coatings. The FIG. 1, FTA ($Fe_2O_3$ +$TiO_2$+$Al_2O_3$) coating is much harder than 99% alumina. The FTA coating is softer to a slight extent as with the 97% alumina. The difference is within the accuracy limits of the test equipment.

The deposit efficiency of the FTA coating exceeds the deposit efficiency of all the prior art coatings. In particular, it exceeds the deposit efficiency of the expensive chromia coating by 25%. This is particularly important since the FTA coating can now replace the chromia coating because it performs with equal satisfaction and at a material cost of ⅕ to ⅐ of the cost of the chromia. The poor deposition efficiency of chromia widens the cost differential even more.

The powders made according to the invention can be sprayed at approximately twice the rate of conventional coating materials. The sprayed coating from these powders, as applied, has a shiny, molten appearance which changes to a matte finish in apeparance as it cools. It is theorized that the reduction in melting point of the complex due to the additives, allows the individual particles to melt completely in the plasma flame and arrive at the substrate in a molten condition which flows on the surface of the substrate. Conventional materials with their higher melting point, impinge on the substrate in a semi-solid condition. From microscopic examination of the prior art sprayed coatings, it appears each individual particle remains static on the substrate and does not shown any flowability.

In a microscopic examination comparing a prior art alumina and chromia sprayed coating (FIGS. 2 through 4) and a coating of alumina complex oxide (FTA), the prior art alumina and chromia coatings appear to be formed of individual groups of particles (clumps). A spongy appearance is observed.

Figure 5A:
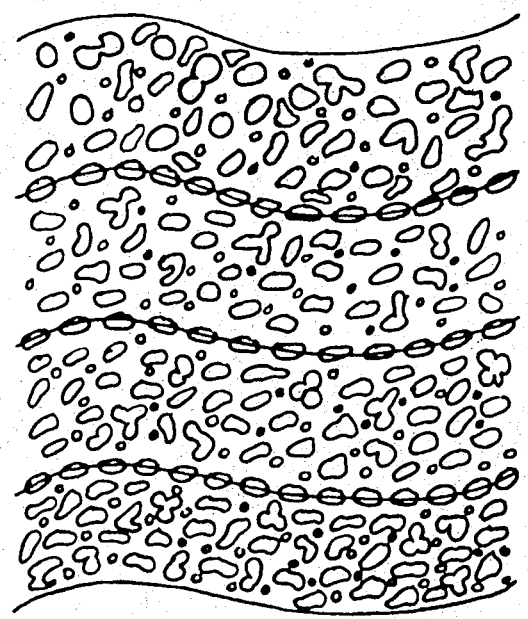
FIG. 5 is a pictorial representation of spray deposited coatings.

Observation of the lower layer, adjacent to the substrate prior art coatings appear rather well-bonded to the substrate but in succeeding layers the coating appeared to lose some of its integrity and each individual particle appeared more discrete and less well-bonded to adjacent particles. The bores were, in general, large and interconnected with adjacent pores in many cases. The interconnected pores are responsible for the flakiness and scaliness in the coating. A very large number of pores appears at the interface between adjacent layers. See FIG. 5A.

Figure 5B:
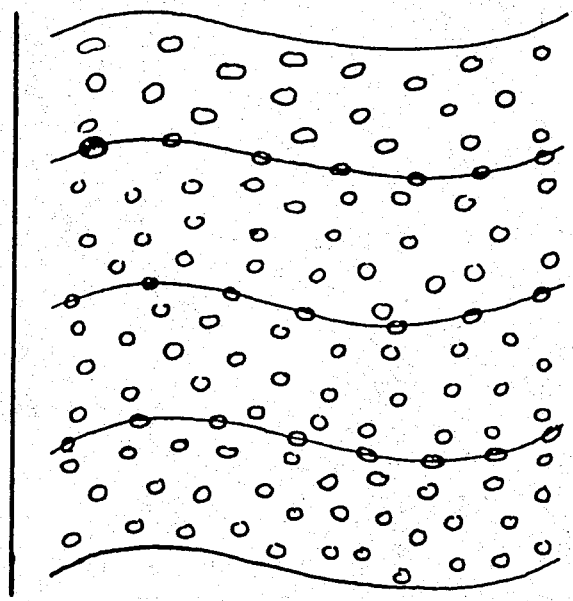

On the other hand, the petrographic examination of the coating of complex oxides had somewhat the appearance of sedimentary soil layers. Each layer was closely bonded to the previous layer; the material was sparsely porous within each layer. Existing pores are small and isolated. A very few isolated pores occurred at the interface between adjacent layers. See FIG. 5B. The FTA coating structure is microcrystalline, the microcrystalline structure resulting directly from recrystallization of the molten particles on freezing.

DESCRIPTION OF THE PREFERRED EMBODIMENT

Various oxides are or may be used in making the spray powder according to the invention. Alumina, zirconia or chromia may be used as the major portion of the complex with additives of iron oxide to reduce the melting point, titanium dioxide to add toughness to the sintered product, magnesium oxide, in very small amounts, to control the crystal size. Silica, which is often present in raw mineral oxides may be included in the mix to provide a glassy phase in the coating.

An important criteria is to combine—react or dissolve—the matrix material with the additives in sufficient quantities to create an additional phase and/or phases in the sprayable composition. The presence of the additional phases enables the plasma generator to propel particles of material to the substrate in a molten condition, thus generating a very dense coating. The net result is the more efficient utilization of the wear resistant and hardness properties of the matrix materials.

A typical formulation would have a composition in the range below:

| | Percent by weight |
|---|---|
| Matrix | 75–95 |
| $TiO_2$ | 3–20 |
| $Fe_2O_3$ | 2–10 |
| $SiO_2$ | 0–10 |
| MgO | 0–2 |

Pure alumina has a sintering temperature in the neighborhood of 3200° F. The addition of small amounts of iron oxide makes it possible to sinter in the temperature range of 2400–2500° F. The addition of the titania may also aid in reducing the sintering temperature of the complex, and it also aids in increasing the toughness of the sprayed coating. Magnesium oxide is known to be useful for controlling crystal growth during the sintering process.

Alumina and zirconia pre-sintering compositions of the preferred proportions within the general range are specified below.

| (Al$_2$O$_3$) | Percent by weight | | | (ZrO$_2$) |
|---|---|---|---|---|
| | 91 | 88 | 75 | 88.2 |
| Matrix: | | | | |
| Fe$_2$O$_3$ | 6 | 6 | 6 | 7.4 |
| TiO$_2$ | 3 | 3 | 19 | 4.4 |
| SiO$_2$ | | 3 | | |

The oxides in the form of particles of less than 5 microns and preferably 2-3 micron diameter were mixed thoroughly and made into a slurry with water. The charge is put into a vibrating mill for further size reduction and blending. After a suitable length of time of blending, about four hours, the slurry was run into a drum dryer to remove the moisture. Filter cakes thus obtained were broken up into small pieces for sintering. This size reduction may be accomplished by forcing through a screen or by merely breaking up the cake with a hammer. The resulting small particles are then sintered in a furnace under oxidizing conditions up to 2400-2500° F. for a period of three hours at peak temperature to react and sinter the oxide mix. After the sintering process the sintered masses are ground or pulverized into suitable particle sizes 15-50 microns for plasma spray application.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A pre-sintered spray coating composition consisting essentially of a mixture of powders consisting essentially of a matrix material selected from the group consisting of alumina, and zirconia plus additional constituents consisting essentially of Fe$_2$O$_3$ and TiO$_2$, the matrix comprises 75-95 percent by weight and said TiO$_2$ and Fe$_2$O$_3$ in the respective proportions of 3-20 percent and 2-10 percent by weight relative to the whole.

2. A spray coating composition as defined in claim 1 wherein said mixture includes in addition material selected from the group consisting of up to 10 percent SiO$_2$ and up to 2 percent MgO both by weight, both relative to the whole.

3. A spray coating composition as defined in claim 1 wherein said ceramic matrix is Al$_2$O$_3$ and includes an additional phase consisting essentially of a pseudobrookite of Al$_2$O$_3$ and TiO$_2$ and Fe$_2$O$_3$.

4. A spray composition as defined in claim 2 which includes in addition a mullite phase consisting essentially of Al$_2$O$_3$ with SiO$_2$.

References Cited

UNITED STATES PATENTS

| 2,775,531 | 12/1956 | Montgomery et al. | 117—46 X |
| 2,898,217 | 8/1959 | Selsing | 106—46 |
| 3,080,135 | 3/1963 | Steijn | 117—46 X |
| 3,121,643 | 2/1964 | Eisenberg | 117—46 X |
| 3,264,508 | 8/1966 | Lai et al. | 219—121 |
| 3,291,619 | 12/1966 | Luks | 106—46 |
| 3,347,698 | 10/1967 | Ingham | 117—47 |
| 3,442,668 | 5/1969 | Fenerty et al. | 106—39 |
| 2,887,394 | 5/1959 | Bickford et al. | 106—65 X |
| 3,395,030 | 7/1968 | Dittrich | 106—43 |

OTHER REFERENCES

Frenzel, G.: Observation of Heated Materials ... Pseudobrookite, in Chemical Abstracts, 49 (1955), p. 5227 b.

Skinner et al.: Effect of TiO$_2$, Fe$_2$O$_3$ and alkali ... Mullite-Forming Al$_2$O$_3$-SiO$_2$ Mixtures, in Jour. Amer. Cer. Soc., 36, 1953, pp. 349-51.

Economos et al.: Metal-Ceramic Interactions, in Journ. Amer. Cer. Soc., 36, 1953, pp. 403-409.

Meyer, W.B.: Flame Sprayed Fusible Alloys, in Materials Protection, vol. 2, No. 1, January 1963, pp. 21-24 and 27.

TOBIAS E. LEVOW, Primary Examiner

W. R. SATTERFIELD, Assistant Examiner

U.S. Cl. X.R.

106—57, 65; 117—105.2